US008880283B2

(12) United States Patent
Kaufmann et al.

(10) Patent No.: US 8,880,283 B2
(45) Date of Patent: Nov. 4, 2014

(54) DEPLOYABLE FLIGHT RECORDER

(71) Applicant: DRS C3 & Aviation Company, Herndon, VA (US)

(72) Inventors: Ari Kaufmann, Herndon, VA (US); Blake van den Heuvel, Herndon, VA (US); Mark Woozley, Herndon, VA (US)

(73) Assignee: DRS C3 & Aviation Company, Herndon, VA (US)

( * ) Notice: Subject to any disclaimer, the term of this patent is extended or adjusted under 35 U.S.C. 154(b) by 0 days.

(21) Appl. No.: 13/830,147

(22) Filed: Mar. 14, 2013

(65) Prior Publication Data
US 2014/0277923 A1    Sep. 18, 2014

(51) Int. Cl.
*B64D 45/00* (2006.01)
*B64D 25/20* (2006.01)
*G01S 1/00* (2006.01)
*G01S 5/02* (2010.01)

(52) U.S. Cl.
CPC ............... *B64D 45/00* (2013.01); *B64D 25/20* (2013.01); *B64D 2045/0065* (2013.01); *B64D 2700/62289* (2013.01); *G01S 5/0231* (2013.01)
USPC .......................................... 701/33.4; 369/21

(58) Field of Classification Search
CPC ................... G07C 5/085; B64D 45/00; B64D 2045/0065; B64D 25/20; B64D 2700/62289; H05K 5/0213; G01S 5/0231
See application file for complete search history.

(56) References Cited

U.S. PATENT DOCUMENTS

| 3,140,847 | A | 7/1964 | Ames, Jr. |
| 4,996,909 | A | 3/1991 | Vache et al. |
| D413,316 | S | 8/1999 | Klinker |
| D436,357 | S | 1/2001 | Klinker |
| D470,450 | S | 2/2003 | Olzak |
| D586,800 | S | 2/2009 | Andre et al. |
| D608,362 | S | 1/2010 | Barron et al. |
| D662,501 | S | 6/2012 | Lohman |

(Continued)

FOREIGN PATENT DOCUMENTS

| CA | 530127 | 9/1956 |
| CA | 575533 | 5/1959 |

(Continued)

OTHER PUBLICATIONS

Cornillou, Jean-Charles (2011). *International Cospas-Sarsat Programme: From operations to MEOSAR prospects* [PowerPoint slides], [retrieved on Jun. 26, 2013]. Retrieved from the Ifremer website: <URL: http://www.ifremer.fr/web-com/sar2011/Presentations/ SARWS2011_CORNILLOU.pdf>, 23 pages. [earliest known date of availability on May 12, 2011].

(Continued)

*Primary Examiner* — Michael J Zanelli
(74) *Attorney, Agent, or Firm* — Kilpatrick Townsend & Stockton LLP (57) ABSTRACT

A deployable airfoil unit is disclosed. It has a housing comprising a front surface and a rear surface joined by a top surface, two opposing side surfaces, and a bottom surface. The top surface and the front surface form an acute angle, and the top surface is larger than the bottom surface. A memory is configured to store flight data or cockpit voice data. A center of mass in the unit is configurable.

29 Claims, 11 Drawing Sheets

(56) References Cited

U.S. PATENT DOCUMENTS

| | | | |
|---|---|---|---|
| D662,937 | S | 7/2012 | Lohman |
| 8,493,715 | B1* | 7/2013 | Angelucci ............... 361/679.01 |
| 2010/0063654 | A1* | 3/2010 | Winterhalter et al. ......... 701/14 |
| 2011/0060498 | A1* | 3/2011 | Cannon et al. ................ 701/35 |
| 2012/0113575 | A1 | 5/2012 | Uy et al. |
| 2012/0138741 | A1 | 6/2012 | Fabre et al. |
| 2012/0166037 | A1 | 6/2012 | Vinue Santolalla et al. |
| 2012/0310487 | A1 | 12/2012 | Thomas et al. |

FOREIGN PATENT DOCUMENTS

| | | |
|---|---|---|
| CA | 610741 | 12/1960 |
| CA | 886721 | 11/1971 |
| CA | 898617 | 4/1972 |
| CA | 1256916 | 7/1989 |
| GB | 2228458 A * | 8/1990 |

OTHER PUBLICATIONS

CPI-406 Deployable Emergency Locator Transmitter (ELT). Datasheet [online]. DRS C3 & Aviation Company, [retrieved on Nov. 20, 2013]. Retrieved from the Internet: <URL: http://www.drs.com/Products/c3a/CPI406.aspx>, 2 pages. [earliest known date of availability on Jul. 18, 2010].

Deployable Flight Incident Recorder Set (DFIRS) 2100. Datasheet [online]. DRS C3 & Aviation Company, [retrieved on Nov. 20, 2013]. Retrieved from the Internet: <URL: http://www.drs.com/Products/c3a/DFIRS2100.aspx>, 2 pages. [earliest known date of availability on Sep. 4, 2010].

Emergency Avionics System 3000 (EAS3000). Datasheet [online]. DRS C3 & Aviation Company, [retrieved on Nov. 20, 2013]. Retrieved from the Internet: <URL: http://www.drs.com/Products/c3a/EAS3000.aspx>, 2 pages. [earliest known date of availability on Jul. 21, 2010].

ELB3000F and EAS3000F Emergency Locator/Recorder System. Datasheet. DRS Data & Imaging Systems, Inc., [retrieved on Nov. 27, 2013]. Retrieved from the Internet: <URL: http://www.drs.com/Products/c3a/3000f.aspx >, 4 pages. [earliest known date of availability on Sep. 4, 2010].

Deployable Flight Data Recorder System. Datasheet [online]. Fairchild Controls, Inc. [retrieved on Apr. 15, 2013]. Retrieved from the Internet: <http://www.fairchild-controls.com/wp-content/uploads/2011/10/FC-VFDRS-brochure.pdf>, 2 pages.

Automatic Deployable Flight Recorder (ADFR). Datasheet. DRS Technologies, Inc., DRS Integrated Defense Systems and Services (IDSS) Group. Nov. 15, 2012. 2 pages.

Notice of Allowance mailed Nov. 4, 2013 in Design U.S. Appl. No. 29/449,264, 10 pages.

* cited by examiner

FIG. 1

PRIOR ART

DEPLOYABLE FLIGHT RECORDER

CROSS-REFERENCES TO RELATED APPLICATIONS

Not Applicable

BACKGROUND

In a catastrophic aviation event involving a downed aircraft, a flight recorder is one of the most useful tools for investigators to piece together the crucial moments leading up to the aircraft accident or incident to determine the cause of the crash. One type of flight recorder is a cockpit voice recorder (CVR) that records the audio environment of the flight deck of an aircraft. A CVR records conversations in the cockpit and communications between the cockpit crew and others such as air traffic control personnel on the ground. Another type of flight recorder is a flight data recorder (FDR) that records information about the electronic and mechanical equipment of the aircraft. A FDR records information such as flight parameters (e.g., altitude, speed, etc.) of the aircraft, and may include engine performance data, or other information useful in assisting investigators to determine the cause of a crash.

A flight recorder is designed to withstand high impact forces and high temperatures such that the flight recorder is likely to survive the conditions of a crash. However, while a flight recorder is designed to survive a crash, there is still a probability that the flight recorder may not survive if the crash conditions are extreme enough. Furthermore, a flight recorder is only useful if the flight recorder can be located after a crash. For example, when an aircraft crashes at sea and is submerged in water, locating the flight recorder affixed to the downed aircraft can take weeks to months, and even years, and can be costly in terms of the amount of money and time spent in locating the flight recorder. Even when an aircraft crashes on land, it may take significant effort and time to locate the flight recorder, for example, when the crash site is an unfamiliar or rough terrain. Such delay in locating the flight recorder not only frustrates investigators but can also risk the safety of other aircrafts. For example, when a catastrophic aviation event is caused by a design flaw in an aircraft component, the delay in identifying the problematic component can risk the safety of other aircrafts that employ the same type of aircraft component.

Flight recorders on aircraft collect at least 25 hours of flight data and at least two hours of cockpit voice information. This information is stored within a crash-survivable memory module which can be retrieved in the event of a crash or as part of regular maintenance. The Achilles' heel of typical "fixed" recorders is that they must be located in order to retrieve the data and in many cases cannot be found after a catastrophic incident. For accidents that occur over water it often takes weeks, months and sometimes years to locate fixed recorders, and often at great expense. Deployable flight recorders (DFRs) solve this problem by separating from the aircraft during a crash thereby avoiding the extreme conditions of the impact zone and allowing for easier recovery.

Conventional deployable flight recorders, however, could be improved. For example, a conventional deployable flight recorder could potentially inadvertently deploy from an aircraft during flight due to a malfunction (e.g., a false detection of a crash). If the flight recorder inadvertently deploys in flight, it could potentially contact parts of the aircraft including the fuselage, horizontal and vertical stabilizers, etc. This could be problematic as damage caused to a plane in flight could result in an emergency landing and costly repairs.

Another problem that exists is the inability of conventional flight recorder units to be repaired, serviced, or replaced without significant work or delay. Conventional deployable flight recorder units have electronics that are integrated with an outer shell, which can serve as part of the exterior of an airplane. If the conventional recorder unit needs to be replaced, then the outer surface of the shell must be re-painted to match the color and/or design of the airplane body or tail art. If the conventional record unit needs to be serviced or repaired, a new outer shell needs to be provided because the electronics are integrated with the outer shell. The new outer shell must also be painted so that it matches the outer surface of the airplane. This can result in a significant amount of downtime and expense.

Embodiments of the invention address these and other problems, individually and collectively.

BRIEF SUMMARY

Embodiments of the invention are directed to flight recorder systems, deployable airfoil units, and methods for producing and using such systems and units. Embodiments of the invention allow an airfoil unit with a crash survivable memory to glide or fly away from an aircraft structure after a potential impact event (e.g., a plane crash) is anticipated. Embodiments of the invention also make it easier and faster to service a deployable airfoil unit, while minimizing the downtime for an airplane.

One embodiment of the invention is directed to a deployable airfoil unit. The deployable airfoil unit comprises a housing comprising a front surface and a rear surface joined by a top surface, two opposing side surfaces, and a bottom surface. The top surface and the front surface form an acute angle. The top surface is larger than the bottom surface. A memory is in the housing and is configured to store flight data and/or cockpit voice data.

Another embodiment of the invention is directed to a deployable flight recorder assembly. The deployable flight recorder assembly comprises a deployable airfoil unit comprising a housing comprising a front surface and a rear surface joined by a top surface. The housing also comprises two opposing side surfaces and a bottom surface. The top surface and the front surface form an acute angle, and the top surface is larger than the bottom surface. The housing also comprises a memory that is configured to store flight data and/or cockpit voice data. The assembly also comprises a tray that is configured to receive the deployable airfoil unit.

Another embodiment of the invention is directed to a method. The method comprises providing a housing comprising a front surface and a rear surface joined by a top surface, two opposing side surfaces, and a bottom surface. The top surface and the front surface form an acute angle. The top surface of the housing is larger than the bottom surface. The method also comprises placing a memory that is configured to store flight data and/or cockpit voice data into the housing, to form a deployable airfoil unit.

Another embodiment of the invention is directed to a deployable airfoil unit comprising a housing comprising a bottom portion comprising a cavity, and a top portion moveably coupled to the bottom portion via a movable element. The moveable element may be a hinge. A memory configured to store flight data and/or cockpit voice data within the housing is also present in the housing.

DETAILED DESCRIPTION

Embodiments of the invention are directed to an improved deployable flight recorder. In embodiments of the invention, voice and datalink data are collected, packaged, and saved to a crash-protected memory in a flight recorder in the form of a deployable airfoil unit. To achieve separation from the aircraft in a crash, the deployable airfoil unit housing the crash protected memory module is designed with aerodynamic properties. When the deployable airfoil unit disengages from the aircraft, it glides away from the aircraft body, and slows down to reduce the impact force. This simplifies recovery of the deployable airfoil unit, and avoids the crash forces associated with the main aircraft wreckage. In the event of an incident over water, or even in a controlled ditching situation, a beacon in the deployable airfoil unit can float indefinitely in fresh water or sea water. In both land and water scenarios, the deployable airfoil unit transmits the last known position of the aircraft to search and rescue personnel along with a localizer signal used to find the recorder itself.

In embodiments of the invention, the lifting body design of the deployable airfoil unit turns the flight recorder into a glider. Embodiments of the invention provide for the separation of the deployable airfoil unit from the aircraft, and the deployable airfoil unit glides away from the aircraft. Embodiments of the invention also provide for an operational safety factor whereby in the extremely unlikely event of a non-crash deployment, the deployable airfoil unit will separate from the aircraft in such a way that it does not damage the aircraft structure. A preferred design of the deployable airfoil unit can include a unique exterior shape as well as a specifically arranged center of gravity within the deployable airfoil unit. In embodiments of the invention, the configuration of the glide path of the deployable airfoil unit can be controlled by tuning the precise location of the center of gravity. Additional configuration of the separation trajectory can be implemented through changing the conditions of the actual aircraft release angle.

Figure 1:
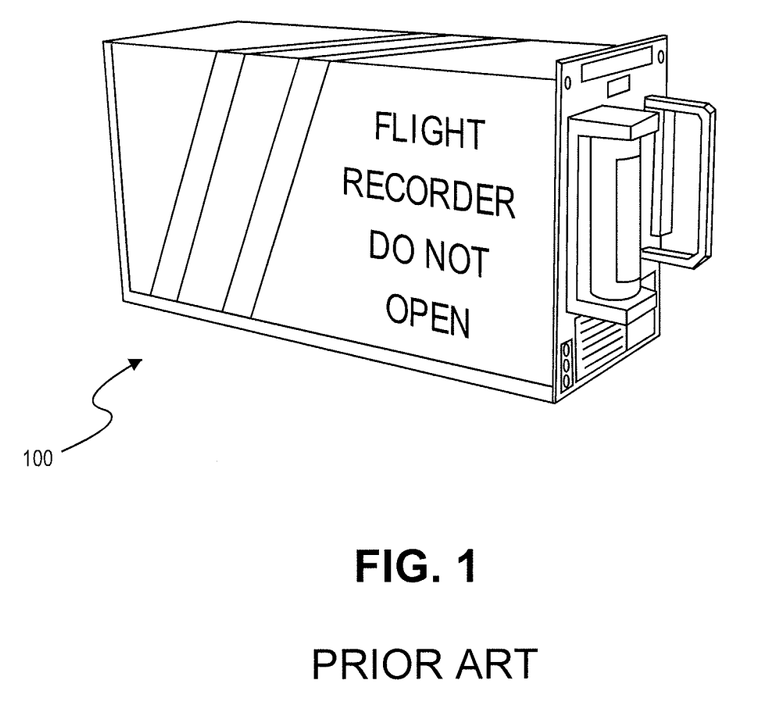
FIG. 1 shows perspective view of a conventional flight recorder.

FIG. 1 shows a perspective view of a conventional flight recorder.

Figure 2A:
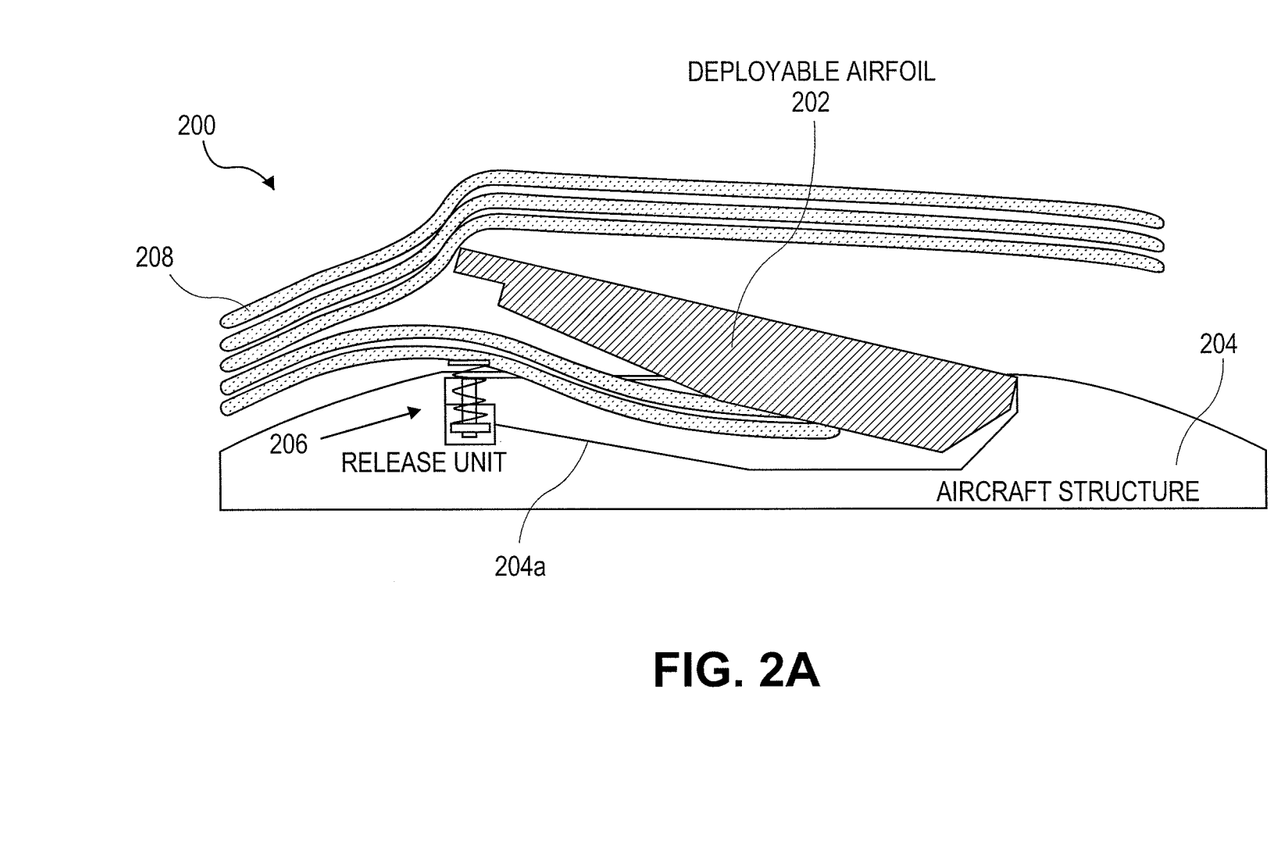
FIG. 2(a) shows a side illustration of a deployable airfoil unit as it begins to separate from an aircraft structure.

FIG. 2(a) shows a schematic drawing of an aircraft assembly 200 comprising a deployable airfoil unit 202 and an aircraft structure 204. The deployable airfoil unit 202, which was originally present in a cavity 204(a) in the aircraft structure 204, is shown as separating from the aircraft structure 204. A release unit 206 attached to the aircraft structure 204 can extend upward after associated electronics detect that a crash is impending to cause a front portion of the deployable airfoil unit 202 to left upward. The airstream 208 causes the deployable airfoil unit 202 to pitch upward away from the aircraft structure 204 as a rear portion of the deployable airfoil unit 202 contacts a rear wall of the cavity 204(a).

Figure 2B:
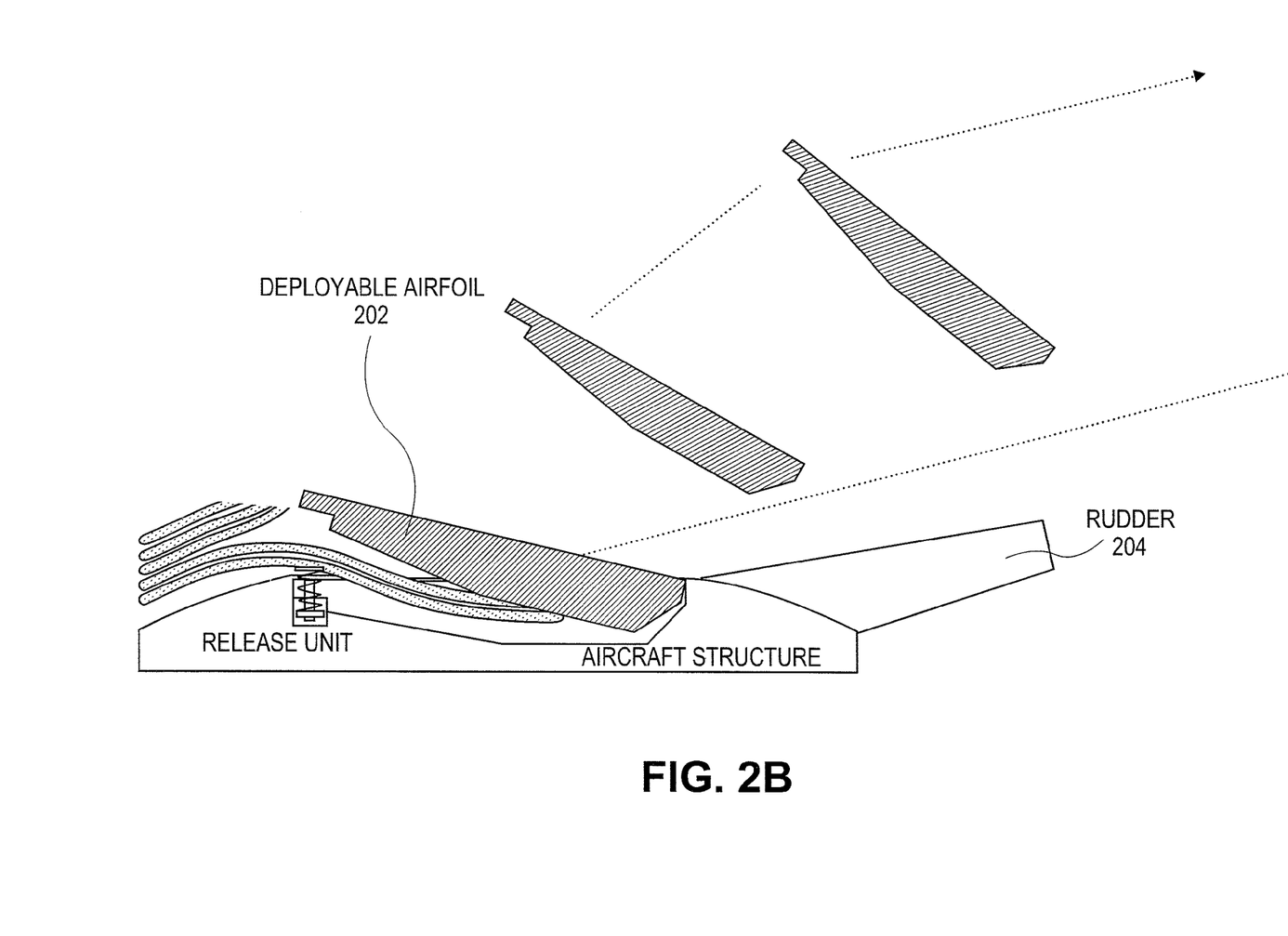
FIG. 2(b) shows the deployable airfoil unit as it moves away from the aircraft structure.

FIG. 2(b) shows the deployable airfoil unit as it moves away from the aircraft structure. As shown in FIG. 2(b), the deployable airfoil unit 202 moves away from the aircraft structure 204 without contacting the aircraft structure.

As noted above, one embodiment of the invention is directed to a deployable airfoil unit. The deployable airfoil unit comprises a housing comprising a front surface and a rear surface joined by a top surface, two opposing side surfaces, and a bottom surface. The top surface and the front surface form an acute angle. The top surface is larger than the bottom surface. A memory is in the housing and is configured to store flight data and/or cockpit voice data.

A "memory" may include any suitable temporary or permanent information storage device, or devices, that can store data. A suitable memory may include one or more of optical, magnetic, or electronic storage media utilizing any suitable optical, electrical, and/or magnetic means of operation. Any suitable number of RAM (random access memory), ROM (read only memory) Flash, and EPROM (erasable programmable memory) chips may also be included in a memory.

Figure 3A:
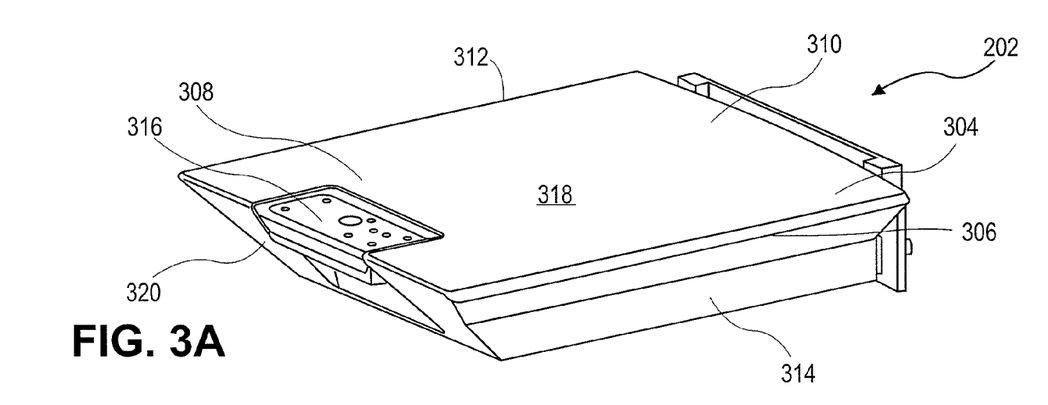
FIG. 3(a) shows a top perspective view of a deployable airfoil unit according to an embodiment of the invention.

FIG. 3(a) shows a top perspective view of a deployable airfoil unit 202 according to an embodiment of the invention. The deployable airfoil unit 202 comprises a housing 304 that comprises a front portion 308 and a rear portion 310. The housing 304 also comprises two opposing first and second side portions 312, 314. A top surface 318 also joins the first and second side portions 312, 314 and forms a major surface of the housing 304. The front portion 308 comprises a lock interface 316, which can be used to lock the deployable airfoil unit 202 to an aircraft structure (not shown). The lock interface 316 may use any suitable type of lock (e.g., a simple twist lock, a mechanical latch, locking pin, a key lock or combination lock) to lock the housing of the deployable airfoil unit and/or to secure the deployable airfoil unit to a tray and/or an aircraft structure. The lock interface 316 may form part of a small ledge, the underside of which may serve as a contact point for a release unit.

The front portion 308 also comprises a front face 320 which can form an acute angle with the top surface 318, and an obtuse angle with respect to the bottom surface (not shown in FIG. 3(a)) of the housing 304. Each of the first and second side portions 312, 314 may comprise upper ledges (e.g., ledge 306) and lower vertical side surfaces. The angled front face 320 and the ledges (e.g., ledge 306) can advantageously help the deployable airfoil unit 202 to lift away from the aircraft structure upon deployment, and glide away from the aircraft structure after it separates from it.

The housing 304 of the deployable airfoil unit 202 may comprise any suitable material. Exemplary materials comprise fiberglass, plastics, lightweight metals, high strength composite materials, etc.

The deployable airfoil unit 202 can have any suitable dimensions. For example, the side to side dimension may be less than about 0.5 meters, preferably less than about 0.3 meters. The front to back dimension may less than about 0.5 meters, preferably less than about 0.3 meters. The height may be less than about 0.1 meters, preferably less than about 0.7 meters. In other embodiments, the length and width dimensions may be about 12 inches by about 15 inches.

Figure 3B:
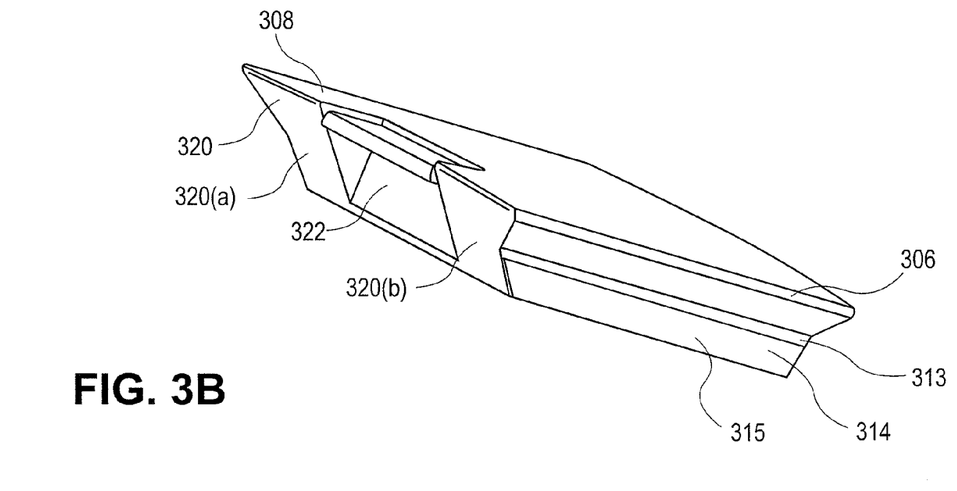
FIG. 3(b) shows a perspective view of another deployable airfoil unit according to another embodiment of the invention from the bottom and side of the deployable flight recorder.

FIG. 3(*b*) shows a bottom view of another deployable airfoil unit 202 according to another embodiment of the invention. In this example, the configuration is somewhat similar to the deployable airfoil unit 202 in FIG. 3(*a*). However, the contour of the side surfaces of the second side portion 312 of this embodiment is different than the embodiment illustrated in FIG. 3(*a*). As shown in FIG. 3(*b*), a V-shaped side surface of the second side portion 314 may comprise an upper ledge 306 and a lower ledge 315. A horizontal mid-section may be depressed inwardly relative to the upper ledge 306 and the lower ledge 315.

FIG. 3(*b*) also more clearly shows certain aspects of the front portion 308 of the deployable airfoil unit 202. The front portion 308 comprises two lateral sections 320(*a*), 320(*b*) separated by a cavity 322. The front portion 308 in FIG. 3(*b*) is similar to the front portion 308 in FIG. 3(*a*).

Figure 4:
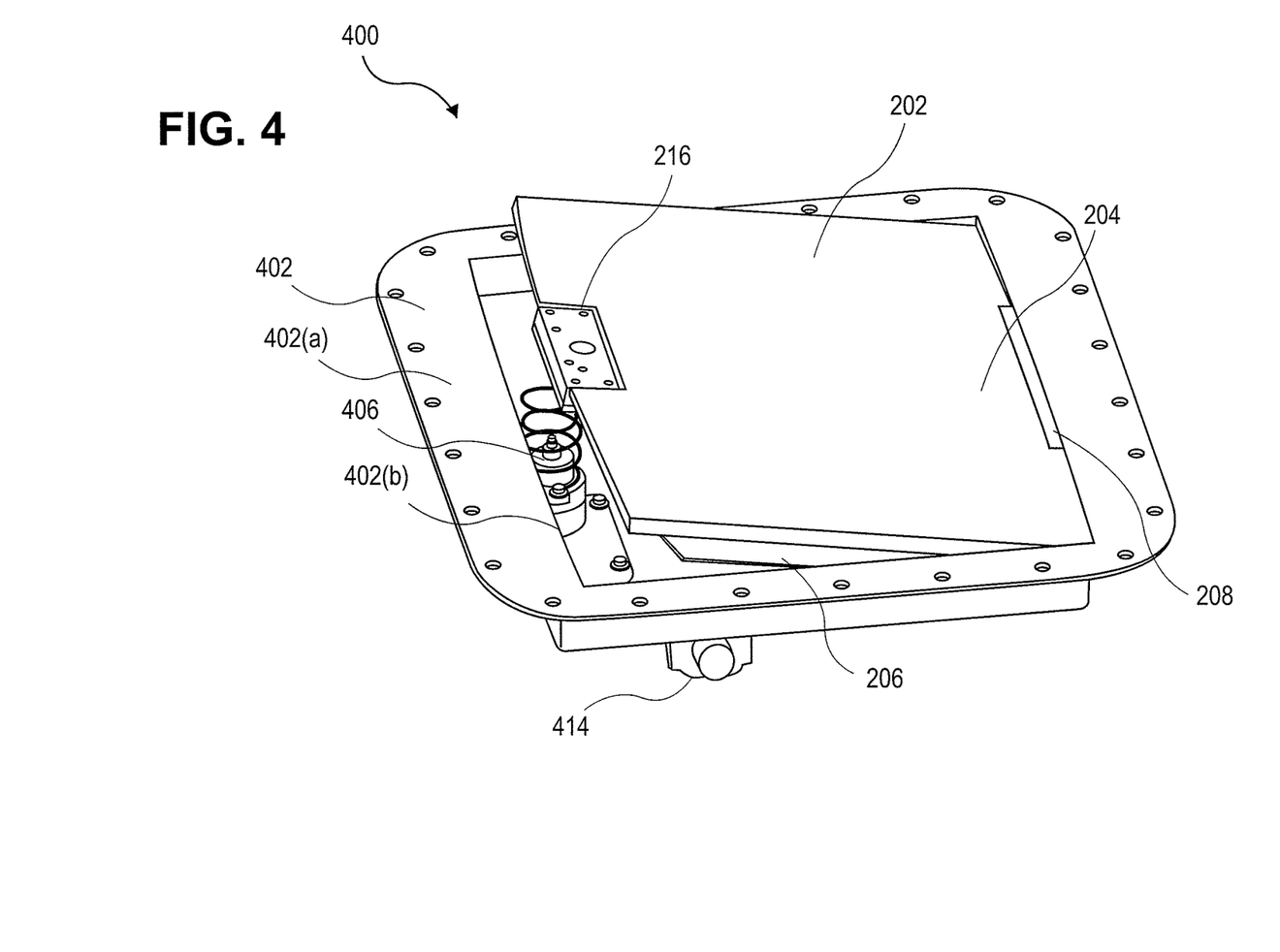
FIG. 4 shows a diagram of a deployable flight recorder assembly according to an embodiment of the invention. The deployable flight recorder assembly shows a partial ejection of the deployable airfoil unit.

FIG. 4 shows a top perspective view of a deployable flight recorder assembly 400. The deployable flight recorder assembly 400 comprises a deployable airfoil unit 202 as described above with respect to FIG. 2(*a*), housed in a tray 402. The tray 402 comprises a rim 402(*a*), which defines a cavity 402(*b*). The rim 402(*a*) may include an upper surface that is co-extensive with an upper surface of the deployable airfoil unit 202 when it is installed in the tray 402. As shown in FIG. 4, the cavity 402(*b*) may be cooperatively structured with respect to the shape of the deployable airfoil unit 202. To initiate the release and separation of the airfoil unit 202 from the tray 402, a release unit 406 may also be present within the cavity 402(*b*) of the tray 402. The release unit 406 may comprise a spring loaded release device, a compressed gas release device. etc. A cable connector 414 is also shown and provides data and power to the electronics in the deployable airfoil unit 202, through electrical connectors in the bottom portion 206 of the deployable airfoil unit 202 and the tray 402.

The deployable airfoil unit 202 is shown as having a housing comprising a top cover 204 comprising a top surface, and a bottom portion 206 with a cavity (not shown) that can contain the electronics in the deployable airfoil unit 202. Although the housing is shown as being a two-piece construction, it may have more than two pieces in other embodiments of the invention. The top cover 204 and the bottom portion 206 may be movably coupled together by a connecting element such as hinge 208. Another type of connecting element may be a rail that allows a top cover to slide with respect to a bottom portion. The deployable airfoil unit housing shown in FIG. 4 may be referred to a "clamshell" in some embodiments. The top surface of the top cover 204 may be painted with a color or design that matches that of the surrounding body of the aircraft structure. For example, the top surface of the top cover 204 may include an airline carrier logo or a portion of such a logo. The top cover 204 may have a paintable top surface, and the housing supports field-replacement of electronics components without the need to repaint an integrated assembly as in conventional units.

The clamshell design of the deployable airfoil unit 202 has a number of advantages. The clamshell design makes it easier to replace any electronics inside of the deployable airfoil unit 202. For example, if a battery becomes bad or if an electronic component fails, then the deployable airfoil unit 202 may be taken out of the tray 402. The top cover 204 can be opened, and the electronics inside can be taken out and replaced. After unit 202 is fixed, the unit 202 can be inserted back into the tray 402. Since the electronics inside unit 202 can be swapped out independently of cover 204, the airfoil unit 202 can be serviced quickly, for example, while the aircraft is on the runway in between flights. The movable top cover 204 also allows replacement of the airfoil electronics without requiring repainting of a housing to match the exterior of the aircraft. For example, a conventional deployable flight recorder unit would not be able to achieve these advantages. In a conventional unit, a flight recorder has integrated antennas or electronics built into or attached to the housing (or shell), so it is not possible to change internal components without changing the housing (or shell). Conventional flight recorders are not designed in a modular manner as in embodiments of the invention. In a conventional flight recorder, swapping out the electronics of the flight recorder typically requires the cover (i.e. housing or shell) to be replaced, thus causing significant downtime and problems when trying to match a color scheme and/or painted design of a re-painted cover with the body of the aircraft structure.

Figure 5:
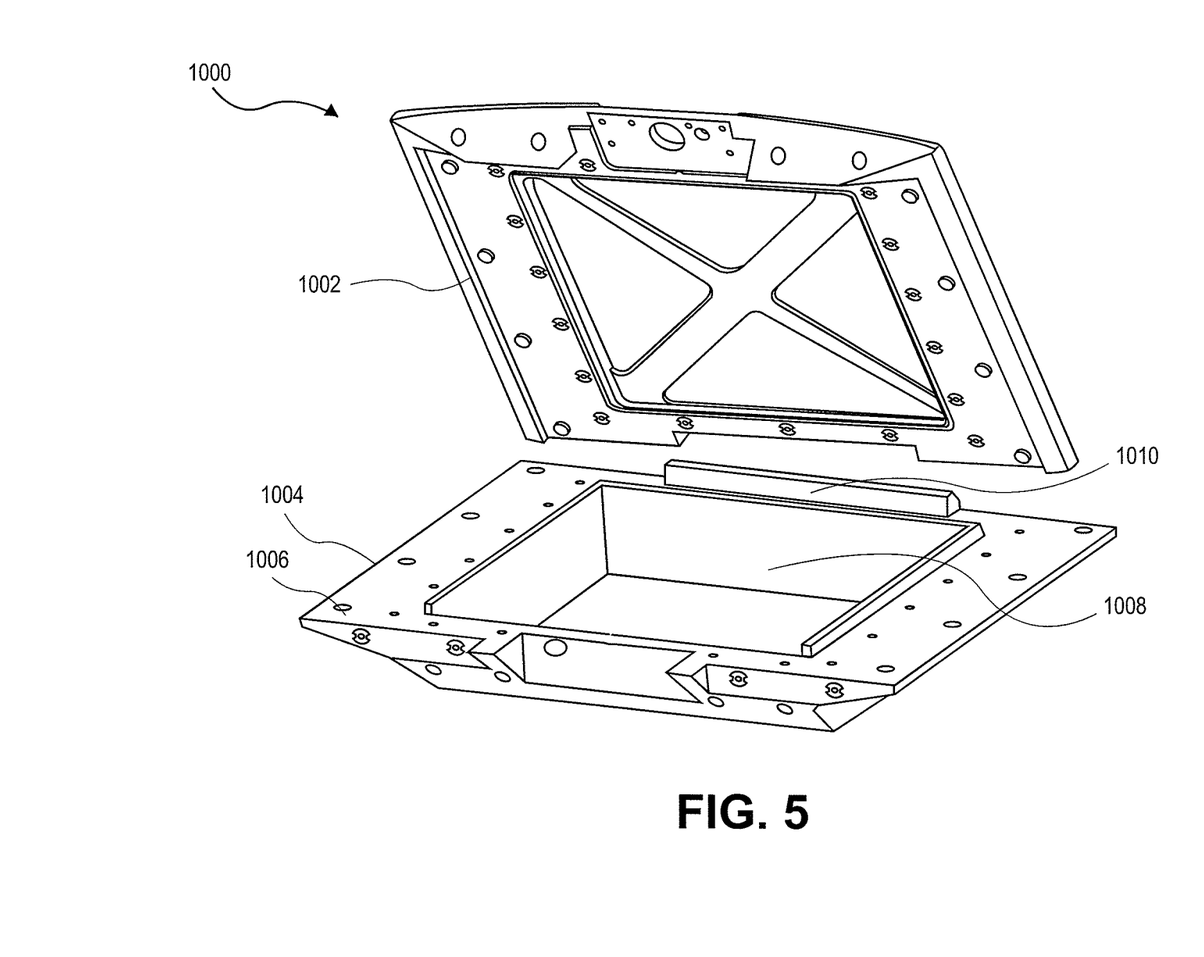
FIG. 5 shows a housing for a deployable airfoil unit in the form of a clamshell structure including a tray and a cover.

FIG. 5 shows a clamshell structure 1000 including a tray 1004 and a cover 1002. No electronic parts are shown in FIG. 5. A deployable flight recorder may be stored in the clamshell structure 1000. As shown, the tray 1004 comprises a rim 1006, which defines a cavity 1008. A hinge 1010 may join the tray 1004 and the cover 1002. The cover 1002 may be a purely mechanical structure that can contain electronics for a flight recorder.

The clamshell housing structure 1000 serves as a multi-layered protective environment for the deployable electronics package. It can be designed to mitigate the forces of extreme impact, penetration, crush, and fire associated with a catastrophic crash. It can allow the memory to remain intact, and an integrated emergency locator transmitter (ELT) to transmit effectively. The outward-facing surface of the deployable airfoil unit can be painted or primed to allow for application of different colors.

As explained above, the advantage of the clamshell housing structure 1000 is that a maintenance worker that wants to service the flight recorder can simply remove the entire clamshell structure 1000 from the aircraft structure, and then remove the electronics within the clamshell structure for repair or replacement. When the work is finished, the maintenance worker can re-attach the entire clamshell structure (with the electronics inside) to the aircraft structure. This is much more convenient than conventional methods for servicing a flight recorder. In a conventional method, a cover plate is removed from the aircraft structure and the electronics of the flight recorder are not easily removed from the flight recorder housing.

Figure 6:
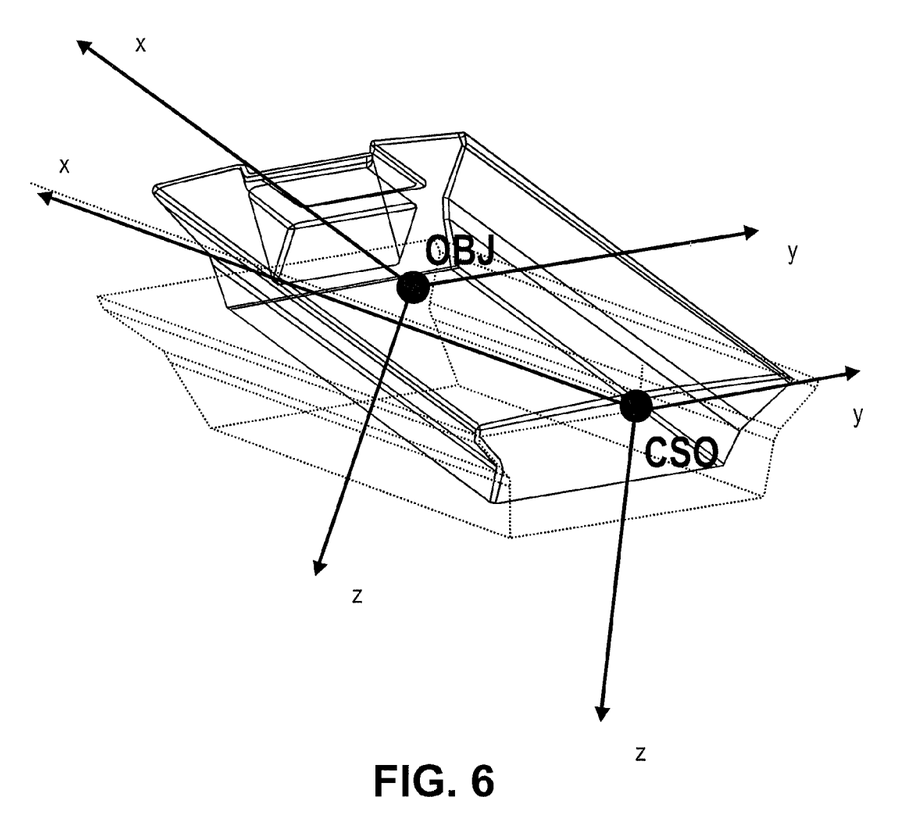
FIG. 6 shows wireframes of a deployable airfoil unit and a tray. The deployable airfoil unit is partially lifted out from the tray, and a coordinate origin and a center of gravity for the deployable airfoil unit are shown.

FIG. 6 shows wireframes of a deployable flight recorder and a tray. The deployable flight recorder is partially lifted out from the tray, and a coordinate origin and a center of gravity for the deployable flight recorder are shown. In particular, FIG. 6 shows an airfoil unit including CSO and OBJ coordinate systems. The first axis system is located at the airfoil unit coordinate system origin (CSO). When the airfoil unit is deployed from the carriage position, it rotates relative to the Y axis of the CSO axis system. The axis orientations follow the standard conventions used for trajectory predictions. The X axis points forward while the Z axis points downward relative to the airfoil unit initial position. The orientation of the Y axis is given by the vectoral right-hand rule. This axis system is fixed relative to the aircraft. Its position and orientation are given relative to the aircraft axis system (AC) which is also fixed to the aircraft with the origin at the nose.

Another axis system, called OBJ for airfoil object, is located at the center of gravity (CG) (or more generically, a center of mass) of the airfoil unit. The orientation of this axis system is the same as the CSO axis initially. It is however, fixed to the airfoil unit and moves with it during its deployment.

It is desirable to have the center of gravity for the airfoil unit moved forward along the X-axis in order to provide for a stable pitching moment as a function of the angle of attack. Further, is also desirable to have the center of gravity as close to the origin of the Y-axis as possible, in order to reduce the chances of creating an undesirable rolling moment after deployment of the deployable airfoil unit. In some embodiments, the center of mass can also be located in a place where airfoil unit has the maximum lifting force at an angle of attack of about 30 degrees. The center of mass can be adjusted so that the airfoil unit has the most stable lift characteristics.

Embodiments of the invention allow a user to configure the center of mass within the deployable airfoil unit. This can be accomplished by a number of different ways. For example, in some embodiments, the electronics in the deployable airfoil unit can be designed so that they can be easily rearranged so that the center of mass shifts to the optimal position for the particular aircraft. For instance, the battery may weigh more relative to other components in the airfoil unit and may be re-configured or re-positioned along with other components so that the airfoil unit has the optimal trajectory away from the particular aircraft structure to which it is attached, should the airfoil unit deploy while the aircraft structure is in flight. Additionally, the same airfoil unit may have a standard set of parts and can be easily arranged within the housing so that the optimal arrangement can be obtained to achieve the optimal trajectory for a particular aircraft structure. In another example, a weight or ballast may be added to the airfoil unit to re-locate the center of mass within the airfoil unit.

FIGS. 7(a)-7(f) show flight trajectories of deployable flight recorders according to embodiments of the invention. As shown, the airfoil unit may be located on the vertical fin of an aircraft structure. More specifically, it may be located near the root of the vertical fin at the front portion of the fin (e.g., less than about 4 meters (e.g., 3.2 meters) from the leading edge of the fin, and less than about 1 meter (e.g., 0.5 meters) higher than the point at which the leading edge begins. It is desirable to position the airfoil unit close to the root of the vertical fin of the aircraft structure, because there are strong air flowfield effects at this position. In other embodiments, the airfoil unit can be located at other locations of the aircraft such as other positions on the vertical tail fin, on the horizontal tail fin, on either of the wings, or at locations on the airframe.

Figure 7A:
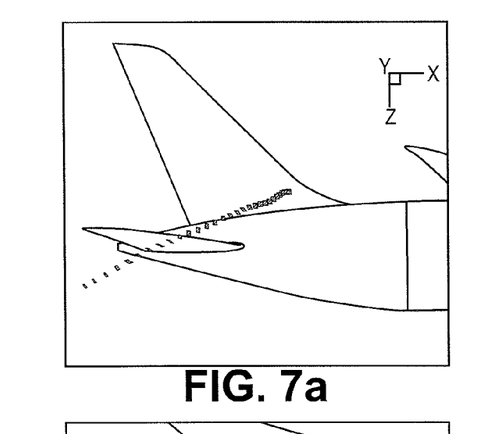
FIGS. 7(a)-7(f) show different flight trajectories of deployable airfoil units according to embodiments of the invention, as the center of mass changes.
Figure 7B:
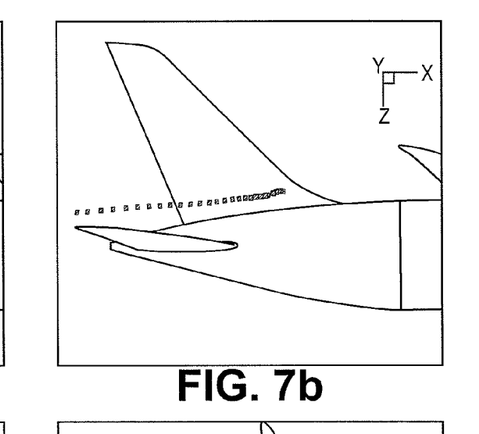
Figure 7C:
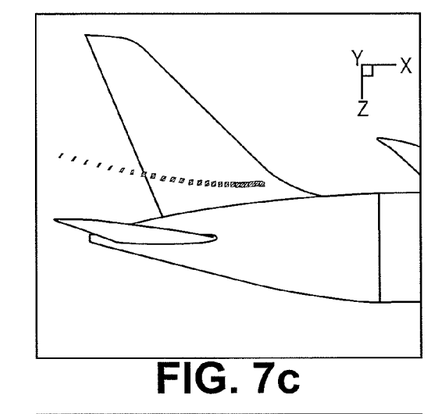
Figure 7D:
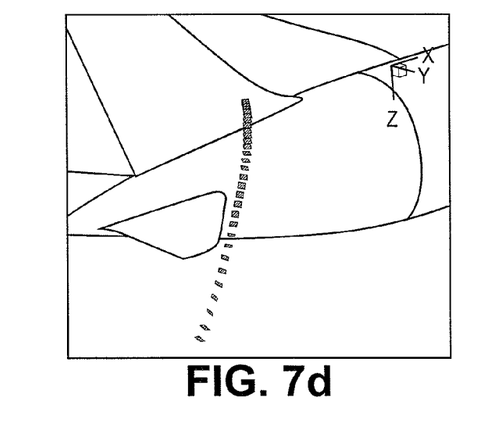
Figure 7E:
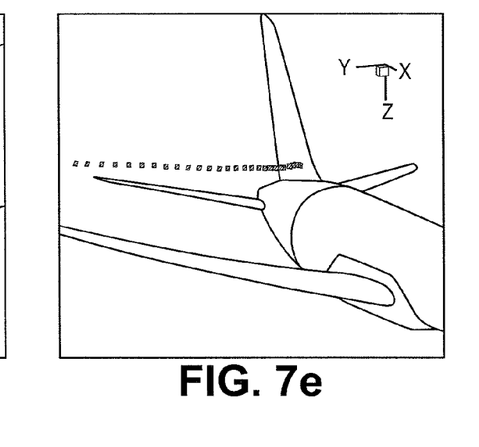
Figure 7F:
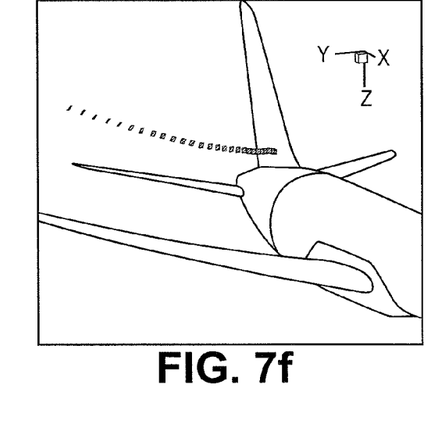

FIGS. 7(a)-7(f) shows simulations of how the trajectory of the airfoil unit differs when deployed from the same aircraft structure, while having the centers of mass at different positions. For example, one may adjust the center of mass in an airfoil unit so that the trajectory shown in FIGS. 7(c) and 7(f) is obtained. This trajectory is the most desirable, since the airfoil unit is shown as moving away from any structure of the aircraft. Table 1 below shows the (X,Y,Z) positions relative to CSO in the CSO axis system.

TABLE 1

| Position | $X_{CSO}$(m) | $Y_{CSO}$(m) | $Z_{CSO}$(m) |
|---|---|---|---|
| CG1 | 0.14980 | 0.000000 | 0.025328 |
| CG2 | 0.18639 | 0.000000 | 0.025328 |
| CG3 | 0.18639 | 0.011123 | 0.025328 |

Figure 8:
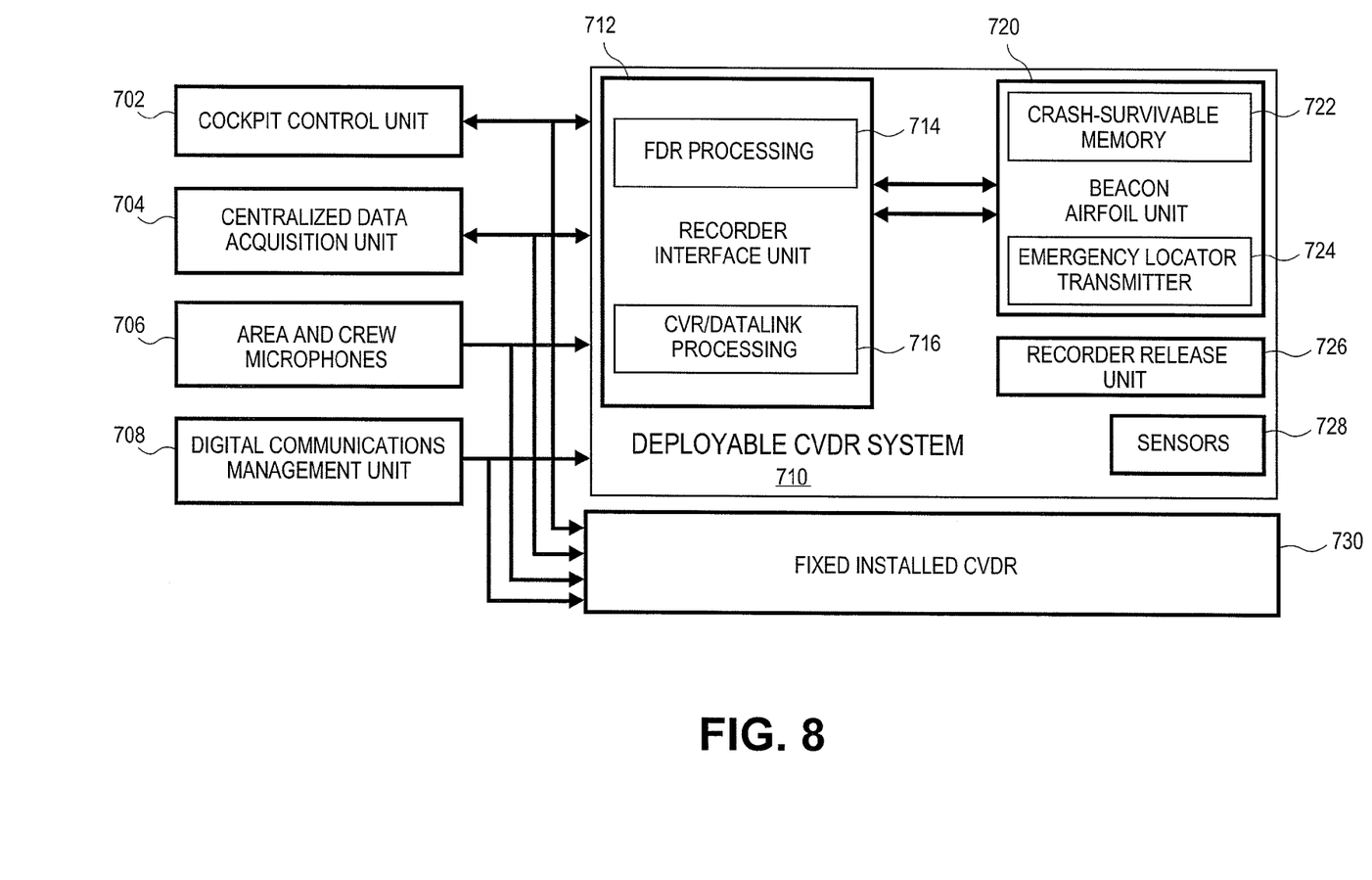
FIG. 8 shows a block diagram of electronics that may be present in a data acquisition and data recorder according to an embodiment of the invention.

FIG. 8 shows a block diagram of a data acquisition and data recorder system according to an embodiment of the invention. The system comprises a cockpit control unit 702, a centralized data acquisition unit 704, area and crew microphones 706, and a digital communications management unit 708. These elements can provide data to the deployable data recorder system 710 as well as a fixed, installed data recorder unit 730. As shown, the fixed installed data recorder unit 730 operates independently of the deployable data recorder system 710.

The deployable data recorder system 710 comprises a recorder interface unit 712 and a deployable airfoil unit 720. The deployable data recorder system 710 also comprises crash detection sensors 728 as well as a recorder release unit 726, which is responsive to the sensors 728. As explained above, the release unit 726 may actuate to cause the separation of the deployable airfoil unit from the aircraft structure.

The deployable data recorder system 710 can include at least four functional elements: data collection; crash-protected electronics, crash sensors, and an airfoil release mechanism. Data collection can be achieved with the recorder interface unit (RIU) 712 which also functions as the primary interface to the aircraft for status and BITE (built-in test environment). The crash protected electronics can include a redundant memory module 722 and emergency locator transmitter (ELT) 724. In some embodiments, ELT 724 may include an integrated GPS receiver that can be used to determine and transmit the location of the deployable data recorder 720 after deployment. These components can be housed in the deployable airfoil unit 720 with the aerodynamic and crash survival properties described above.

In some embodiments, the crash sensors 728 include a multi-axis g-switch, a water-sensing device and frangible switches; other crash sensors may be used if appropriate for an individual aircraft installation. The sensors are connected to the recorder release unit (RRU) 726 which monitors the crash sensors and when crash conditions are detected, it is responsible for releasing the deployable airfoil unit 720. The RIU and RRU electronics can be contained within the same LRU (line replacement unit), or installed in separate units depending on the desired configuration.

Each of the sensors 728 can be rigidly mounted to the airframe, with the frangible switches in positions most likely to be deformed by impact forces, and the g switch where it will receive acceleration forces. The hydrostatic switch would ideally be installed at the point most likely to be most deeply submerged during a water impact, but is normally attached to the mounting tray for the deployable airfoil unit. The health of the deployment sensors 728 can be monitored by the BITE system, and following activation, which sensor caused the deployment is recorded in the BITE log.

Figure 9:
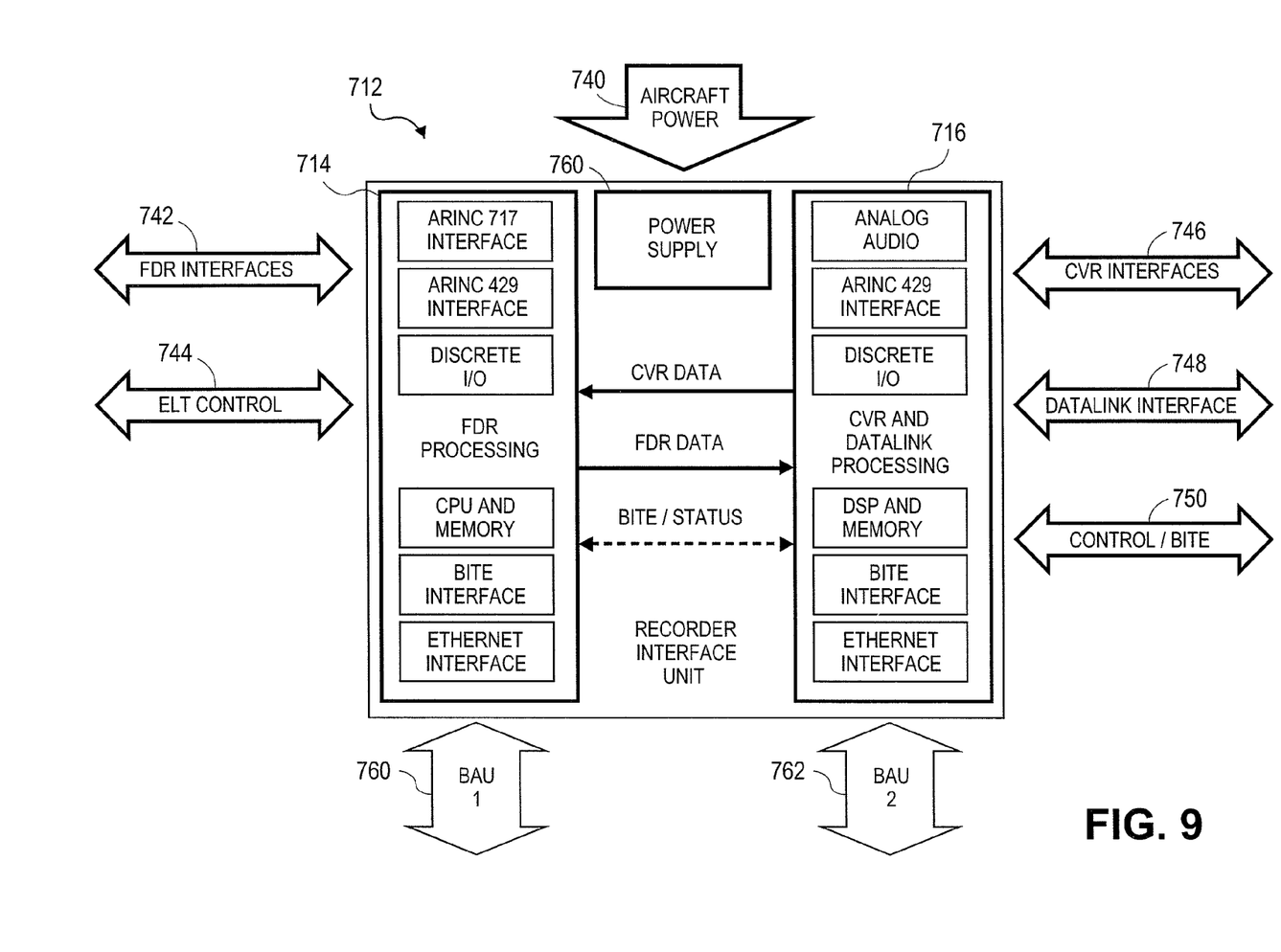
FIG. 9 shows a block diagram of electronics in a recorder interface unit according to an embodiment of the invention.

FIG. 9 shows a block diagram of a recorder interface unit 712. It may include its own power supply 760 and may also receive aircraft power 740. The recorder interface unit 712 is responsible for collecting analog audio, digital datalink and digital flight data from the aircraft interfaces (742, 744, 746, 748, 750) and retransmitting that data for storage in the crash-protected memory within the deployable airfoil unit. While the deployable data recorder system operates as a single combined recorder, internally the FDR and CVR/datalink processing functions 714, 716 are separated such that the failure of one function does not impact others. Each processing element collects its data and packages the information for storage, and then transmits the data on its Ethernet interface (e.g., 760, 762) to the airfoil unit. One-way communication paths are used to allow both processing units to send the complete dataset to the other to provide redundant data paths. The FDR processing unit 714 writes a copy of its data to the CVR processing element 716, and the CVR processing element 716 does the opposite; writing CVR and Datalink data and reading back FDR data. Inter-processor communication is also used for communicating BITE and status between the processing elements.

FIG. 9 also shows that the CVR and FDR functions within the RIU are separated such that a failure of one function will not result in the loss of both recording functions.

The recorder interface unit portion of the deployable recorder is designed to mount using alignment pins and quick release fasteners to a tray which allow rapid removal and replacement for repair purposes. The electronics have been designed for hard-mounting without the need for shock isolators.

Figure 10:
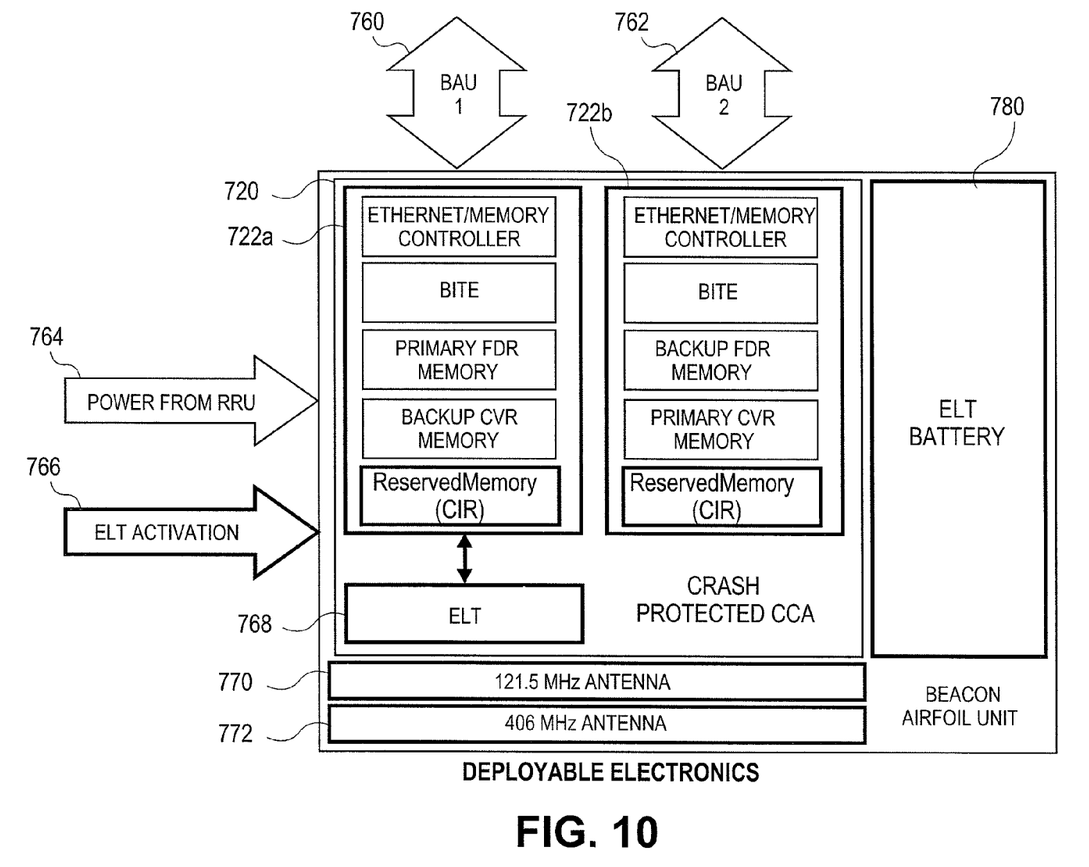
FIG. 10 shows a block diagram of electronics that may be present in a deployable airfoil unit according to an embodiment of the invention.

FIG. 10 shows a block diagram of electronics in the deployable airfoil unit 720. There can be at least four components which reside within the deployable airfoil unit. These may include a deployable airfoil unit circuit card assembly (CCA) (comprising the memories 722(*a*), 722(*b*) and the ELT 768), an ELT Battery 780, a 121.5 MHz antenna 770, and a 406 MHz antenna 772. These four components, protected by the deployable airfoil unit housing, ensures that critical flight information survives a crash, and is rapidly recovered by search and rescue personnel. The crash-survivable circuit card assembly (CCA) contains two memory units 722(*a*), 722(*b*), each with an independent Ethernet interface and memory controller. Ethernet lines 760, 762 can provide data to the memory units 722(*a*), 722(*b*). Further, power 764 may be received from the recorder release unit, and the airfoil unit 720 may receive an ELT activation signal 766.

The memory banks within each memory unit 722(*a*), 722(*b*) can be partitioned into three areas: flight data (at least 1 gigabyte; and sufficient for at least 25 hours of recording at up to at least 8192 words per second); cockpit voice and datalink data (at least 512 megabytes; and sufficient for at least 2 hours of voice recording); and future growth (at least 16 gigabytes; reserved for future growth; and sufficient for at least 2 hours of cockpit image recording).

The first memory unit 722(*a*) contains the primary storage for FDR and future growth data, and the backup memory for CVR data, while the second unit stores the primary CVR data and the backup FDR and future growth data. In the event of a failure of either processing element within the RIU, the data from the remaining function is still recorded. Even in the event of a failure of the inter-processor communication link within the RIU, both CVR and FDR data would be recorded in their primary memory banks, ensuring data continuity. The first memory unit 722(*a*) communicates with the ELT circuitry 768 to provide the last known aircraft position, collects and reports ELT BITE information back to the RIU in addition to its own.

The deployable airfoil unit 720 can be mounted to the aircraft using alignment pins and a tray custom designed for each platform and installation location. The tray provides mounting for the deployment mechanism, and ensures that the airfoil unit shape conforms to the aircraft skin, minimizing drag on the aircraft. The complement to the alignment pins is a latch mechanism designed to keep the airfoil unit installed on the aircraft, until it is released via the deployment circuits. The airfoil unit is spring loaded to provide the force necessary to propel the airfoil unit into the aircraft slipstream during the deployment process. The mechanical interface has been designed to deploy the airfoil unit only when required and to make the chance of an unplanned deployment less than one in ten million flight hours.

Other embodiments of the invention can be directed to methods for manufacturing the deployable data recorder systems described above. One embodiment of the invention is directed to a method comprising providing a housing comprising a front surface and a rear surface joined by a top surface, two opposing side surfaces, and a bottom surface, wherein the top surface and the front surface form an acute angle, and wherein the top surface is larger than the bottom surface. The method also comprises inserting a memory configured to store flight data or cockpit voice data into the housing, to form a deployable airfoil unit. The memory may be part of a circuit card assembly that is mounted within the housing of the deployable airfoil unit. In embodiments of the invention, any of the other described components may also be installed in the housing of the deployable airfoil unit along with the memory.

Once assembled, the deployable airfoil unit may be inserted into a tray, which may have been previously affixed to an aircraft structure. For example, it may be attached to the horizontal or vertical stabilizers of an airplane.

As noted above, it is desirable to adjust the internal components of the deployable airfoil unit so that the center of gravity is adjusted so that the airfoil unit does not contact the aircraft structure if it is deployed during flight. As noted above, the center of gravity may be adjusted so that it is located in the front half of the airfoil unit, and/or located along a centerline between the two sides of the airfoil unit. This can be achieved by locating the particular electronic components in the airfoil unit so that the center of gravity is in the desired position. It could alternatively or additional be achieved by using weights to obtain the optimal location for the center of gravity.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), Flash memory, a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. For example, it is understood that any details of the deployable airfoil structures may be incorporated with the embodiments that describe how such airfoil structures are made without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A deployable airfoil unit comprising:
   a housing comprising a front surface and a rear surface joined by a top surface, two opposing side surfaces, and a bottom surface, wherein the top surface and the front surface form an acute angle, and wherein the top surface is larger than the bottom surface;
   a memory configured to store flight data or cockpit voice data within the housing; and
   a configurable center of mass within the deployable airfoil unit.

2. The deployable airfoil unit of claim 1 wherein the deployable airfoil unit comprises a front portion and a rear portion, wherein the front portion is in the form of a wedge.

3. The deployable airfoil unit of claim 1 wherein the front surface includes two outer front surface portions and an inner front surface portion, wherein the inner front surface portion is disposed inwardly of the two outer front surface portions.

4. The deployable airfoil unit of claim 1 wherein the deployable airfoil unit comprises a front portion and a rear portion, and wherein the center of mass is in the front portion of the deployable airfoil unit.

5. The deployable airfoil unit of claim 1 wherein the deployable airfoil unit is aerodynamically shaped.

6. The deployable airfoil unit of claim 1 wherein the front surface includes two outer front surface portions and an inner front surface portion, wherein the inner front surface portion is disposed inwardly of the two outer front surface portions, and wherein the housing further comprises a ledge comprising a release unit contact point on a bottom surface of the ledge.

7. The deployable airfoil unit of claim 1 further comprising an emergency locator transmitter (ELT) in the housing.

8. The deployable airfoil unit of claim 7 wherein the ELT includes an integrated global position system (GPS).

9. The deployable airfoil unit of claim 1 wherein the housing further comprises opposing side ledges, and wherein the memory is configured to store both flight data and cockpit voice recorder data.

10. A deployable flight recorder assembly comprising:
    the deployable airfoil unit of claim 1; and
    a tray configured to receive the deployable airfoil unit.

11. The deployable flight recorder assembly of claim 10 wherein the tray further comprises a release unit configured to deploy the deployable airfoil unit upon detection of a potential crash.

12. The deployable flight recorder assembly of claim 10 wherein the tray has a cavity that is cooperatively structured with respect to a configuration of the deployable airfoil unit, and wherein the housing is in the form of a clamshell.

13. An aircraft comprising a body the deployable flight recorder assembly of claim 10, attached to the body.

14. The aircraft of claim 13 wherein the deployable flight recorder assembly is located at a tail of the aircraft.

15. The deployable airfoil unit of claim 1, wherein a side to side dimension of the deployable airfoil unit is less than 0.5 meters, wherein a front to back dimension of the deployable airfoil unit is less than 0.5 meters, and wherein a height of the deployable airfoil unit is less than 0.1 meters.

16. The deployable airfoil unit of claim 1, wherein the center of mass of the deployable airfoil unit is located such that the deployable airfoil unit has a maximum lifting force at an angle of attack of 30 degrees.

17. A method comprising:
    providing a housing comprising a front surface and a rear surface joined by a top surface, two opposing side surfaces, and a bottom surface, wherein the top surface and the front surface form an acute angle, and wherein the top surface is larger than the bottom surface; and
    inserting a memory configured to store flight data or cockpit voice data into the housing, to form a deployable airfoil unit.

18. The method of claim 17, further comprising:
    modifying a center of gravity of the deployable airfoil unit to optimize separation of the deployable airfoil unit from the aircraft structure after deployment of the deployable airfoil unit.

19. The method of claim 18 wherein modifying the center of gravity comprises adding a weight to the deployable airfoil unit.

20. The method of claim 17 further comprising inserting the deployable airfoil unit into a tray.

21. The method of claim 20 further comprising:
    attaching the tray to the aircraft structure.

22. The method of claim 21 wherein the tray is located near a base of a vertical fin of the aircraft structure.

23. The method of claim 22 wherein the tray comprises a release unit, configured to cause the deployment of the deployable airfoil unit when an impact event is detected.

24. A deployable airfoil unit comprising:
    a housing comprising a bottom portion comprising a cavity, and a top cover moveably coupled to the bottom portion via a connecting element, wherein the housing comprises opposing ledges and a front face that forms an acute angle with a top surface of the housing; and
    a memory configured to store flight data or cockpit voice data within the housing, and
    wherein the deployable airfoil unit further comprises an emergency locator transmitter in the housing.

25. A deployable flight recorder assembly comprising:
    the deployable airfoil unit of claim 24; and
    a tray configured to receive the deployable airfoil unit.

26. The deployable flight recorder assembly of claim 25 wherein the tray further comprises a release unit configured to deploy the deployable airfoil unit upon detection of a potential crash.

27. The deployable airfoil unit of claim 24 wherein the top cover comprises a paintable top surface, wherein housing supports field-replacement of electronics components without the need to repaint an integrated assembly.

28. The deployable airfoil unit of claim 24, wherein the deployable airfoil unit is configured such that an airstream underneath the deployable airfoil unit causes the deployable airfoil unit to pitch upward.

29. A deployable airfoil unit comprising:
    a housing comprising a bottom portion comprising a cavity, and a top cover moveably coupled to the bottom portion via a connecting element wherein the connecting element is a hinge; and
    a memory configured to store flight data or cockpit voice data within the housing.

* * * * *